(12) United States Patent
Knoski

(10) Patent No.: US 6,820,846 B2
(45) Date of Patent: Nov. 23, 2004

(54) MULTIPLE BALL JOINT GIMBAL

(75) Inventor: Jerry L. Knoski, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 10/408,623

(22) Filed: Apr. 7, 2003

(65) Prior Publication Data

US 2004/0195474 A1 Oct. 7, 2004

(51) Int. Cl.[7] ............................................... B25J 17/00
(52) U.S. Cl. .................... 248/178.1; 248/371; 248/396; 310/24; 434/58
(58) Field of Search ........................... 248/178.1, 179.1, 248/180.1, 181.1, 181.2, 206.5, 274.1, 276.1, 346.05, 346.06, 370, 371, 393, 394, 395, 396, 397, 398; 434/55, 58; 310/24; 74/99 R

(56) References Cited

U.S. PATENT DOCUMENTS

| | | | | |
|---|---|---|---|---|
| 3,374,977 A | * | 3/1968 | Moy, Jr. ................... | 248/163.1 |
| 3,577,659 A | * | 5/1971 | Kail ............................ | 434/58 |
| 4,360,182 A | * | 11/1982 | Titus ........................... | 248/371 |
| 4,798,949 A | * | 1/1989 | Wilcox et al. ............ | 250/203.6 |
| 4,919,382 A | * | 4/1990 | Forman ..................... | 248/178.1 |
| 5,042,763 A | * | 8/1991 | Wong ....................... | 248/178.1 |
| 5,457,349 A | * | 10/1995 | Gifford ...................... | 310/24 |
| 5,544,968 A | * | 8/1996 | Goellner .................... | 403/31 |
| 5,696,413 A | * | 12/1997 | Woodbridge et al. ......... | 310/15 |
| 6,395,193 B1 | | 5/2002 | Kintz et al. ............... | 252/62.52 |
| 6,481,546 B2 | * | 11/2002 | Oliver et al. ............. | 188/267.1 |
| 6,592,374 B1 | * | 7/2003 | Kim ............................ | 434/58 |

OTHER PUBLICATIONS

Popular Science Magazine, extract "Rising on Magnets," date unknown.
Lord Corporation, Rheonetic Magnetic Fluids & Systems Technology, 2 pages, http: //www.rheonetic.com/technology.htm.

* cited by examiner

Primary Examiner—Anita King
Assistant Examiner—Jon Szumny
(74) Attorney, Agent, or Firm—Thomas J. Finn; Leonard A. Alkov; Karl A. Vick

(57) ABSTRACT

A multiple ball joint gimbal mount apparatus which includes a mount platform structure, and a plurality of linear motor actuators arranged in a housing assembly. Each actuator includes an actuator shaft and an actuator connector at a distal end of the shaft. The platform structure includes a plurality of platform connectors each for coupling to a corresponding actuator connector to form a pivoting connection between the actuator shaft and the platform structure. A controller selectively actuates the plurality of linear motor actuators to selectively position the plurality of actuator shafts along respective shaft axes and position the mount platform structure at a selected position within a gimbal range of motion. The gimbal structure can optionally include a mechanism to selectively lock the mount structure in any respective position within the gimbal range of motion.

17 Claims, 4 Drawing Sheets

MULTIPLE BALL JOINT GIMBAL

BACKGROUND OF THE DISCLOSURE

Missile electro-optical and radar seekers, as well as some radar antenna systems, use relatively complex gimbal systems to scan the surroundings to improve their target acquisition areas. Typically, the gimbal systems employ precision-machined gimbal structures with shims, expensive torquer motors, resolvers and gyroscopes. Moreover, shim selection and balancing techniques used during the manufacturing process are time consuming and require expensive specialized weights and testing equipment. Many gimbal systems use analog control systems, requiring analog-digital conversion capability. Another disadvantage is that some seekers lose lock-on during launch due to the shock of the launch event.

SUMMARY OF THE DISCLOSURE

A multiple ball joint gimbal mount apparatus is disclosed, which includes a mount platform structure, and a plurality of linear motor actuators arranged in a housing assembly. Each actuator includes an actuator shaft and an actuator connector at a distal end of the shaft. The platform structure includes a plurality of platform connectors each for coupling to a corresponding actuator connector to form a pivoting connection between the actuator shaft and the platform structure. A controller selectively actuates the plurality of linear motor actuators to selectively position the plurality of actuator shafts along respective shaft axes and position the mount platform structure at a selected position within a gimbal range of motion. The gimbal structure can optionally include a mechanism to selectively lock the mount structure in any respective position within the gimbal range of motion.

BRIEF DESCRIPTION OF THE DRAWINGS

Features and advantages of the disclosure will readily be appreciated by persons skilled in the art from the following detailed description when read in conjunction with the drawing wherein.

DETAILED DESCRIPTION OF THE DISCLOSURE

Figure 1:
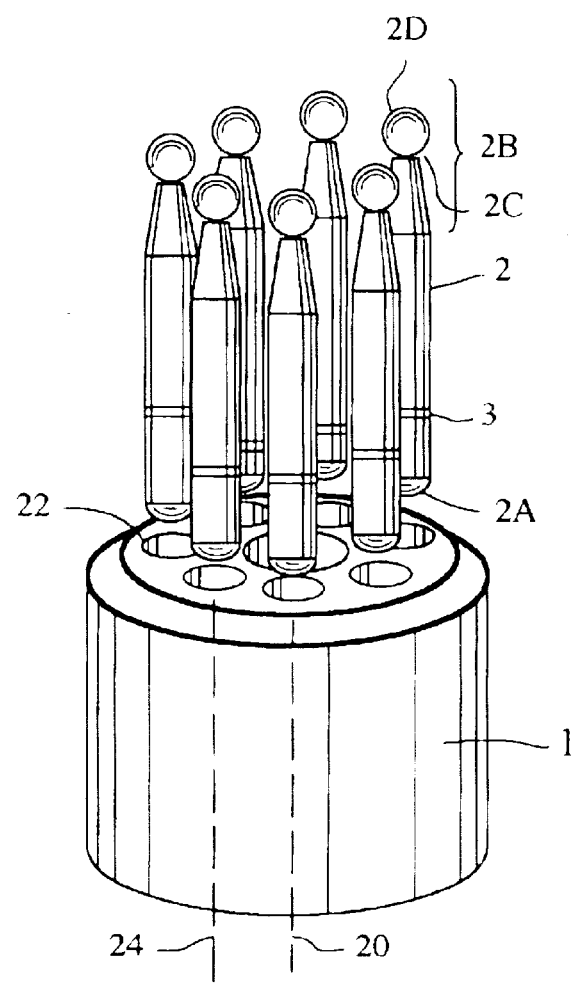
FIG. 1 is a simplified, exploded isometric view of an exemplary embodiment of a gimbal system housing assembly and a plurality of actuator shafts, with embedded magnets.

In the following detailed description and in the several figures of the drawing, like elements are identified with like reference numerals.

An exemplary embodiment of the invention is illustrated in FIGS. 1–4. FIG. 1 shows, in a partially exploded isometric view, a housing assembly 1 and a plurality of actuator shafts 2, each with an embedded magnet 3. In an exemplary embodiment, the actuator shafts 2 are fabricated in two sections of a non-magnetic material, e.g. aluminum, which sandwich and are joined with the magnet 3, e.g. by threaded fastener structures. In this exemplary embodiment, the actuators are disposed on a radius from a center axis 20, and are generally equally spaced from adjacent actuators. The housing 1 has a corresponding plurality of openings or bores 22 formed therein which receive the actuators, which are arranged for linear movement along respective actuator axes such as axis 24.

In this exemplary embodiment, each actuator has a piston end 2B, and an actuator connector structure 2B at the distal end thereof. In this exemplary embodiment, the connector structure includes a tapered region 2C, at the end of which a ball structure 2D is formed.

Figure 2:
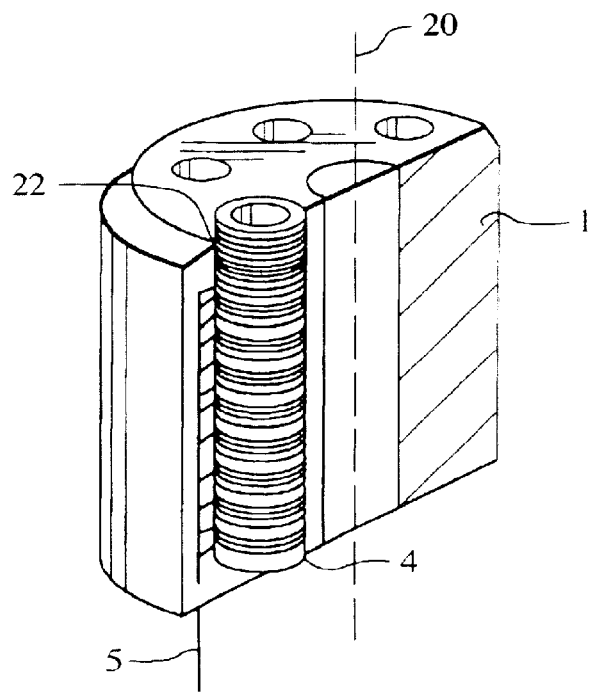
FIG. 2 is a simplified isometric cutaway view of the housing assembly showing one exemplary stack of ring electromagnets and associated wiring.
Figure 3:
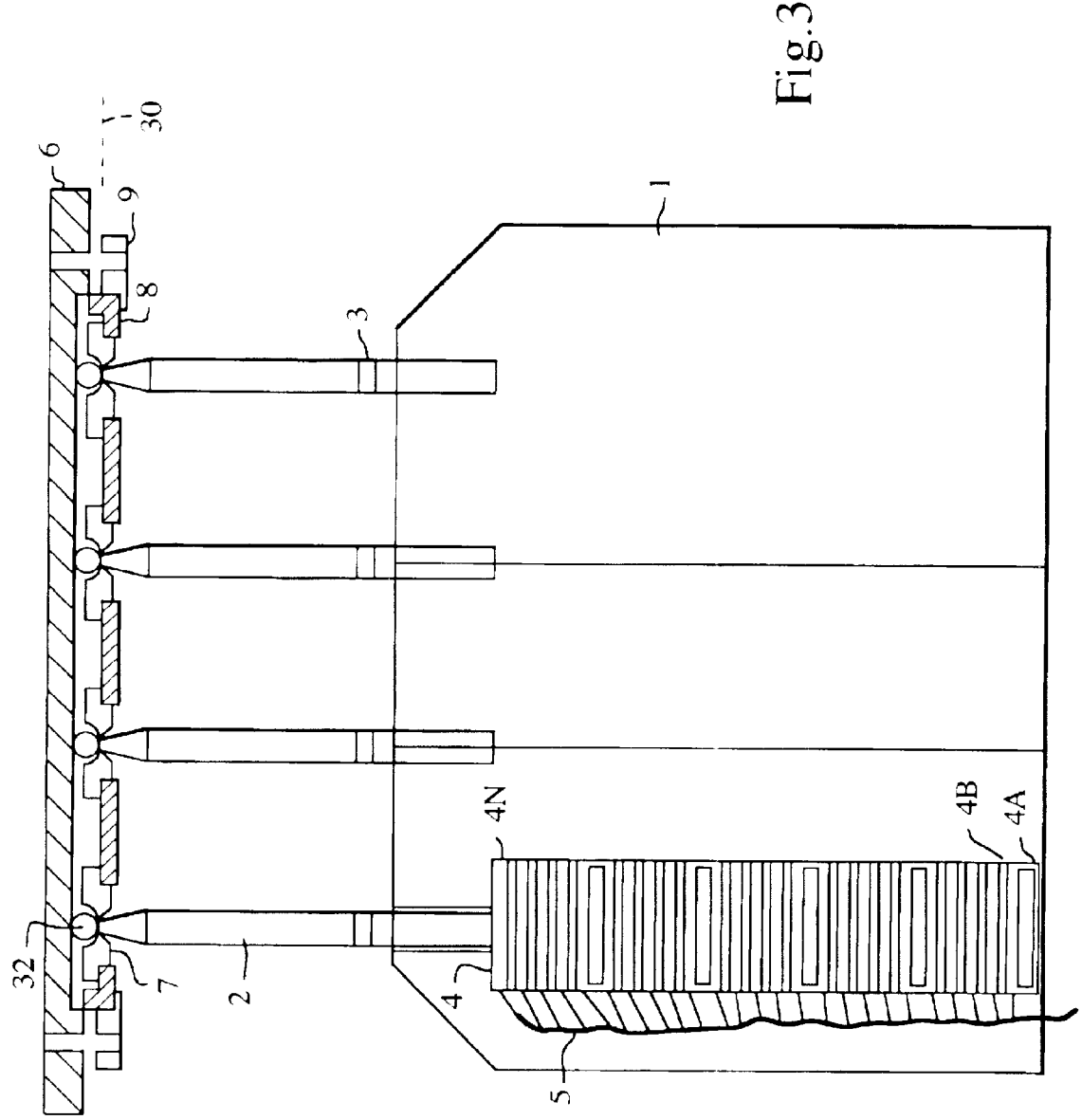
FIG. 3 is a cross-sectional view of the housing assembly, illustrating two exemplary actuator shafts and their interface to a seeker face/camera mount showing the embodiment in its working environment.

FIG. 2 shows the housing 1 in a cutaway view. Each of the actuator shafts 2 slide into the center of a stack of ring electromagnets 4, which are embedded in the housing assembly 1 about each actuator opening 22.

The shafts 2 and embedded magnets 3 are attached to a mount platform structure 6, which can comprise, by way of example only, a seeker face/camera mount 6 (FIG. 3), using in this exemplary embodiment floating ball joint retainers 7, a retainer plate 8, and a retainer ring 9. Each of the retainers 7 in this exemplary embodiment constrains the corresponding actuator connector structure to a position within the plane of the structure 6, while permitting the actuator to pivot about the connection position. For example, the plane is indicated in the cross-section view of FIG. 3 by dashed line 30, and an exemplary pivot position is indicated as 32.

Figure 4:
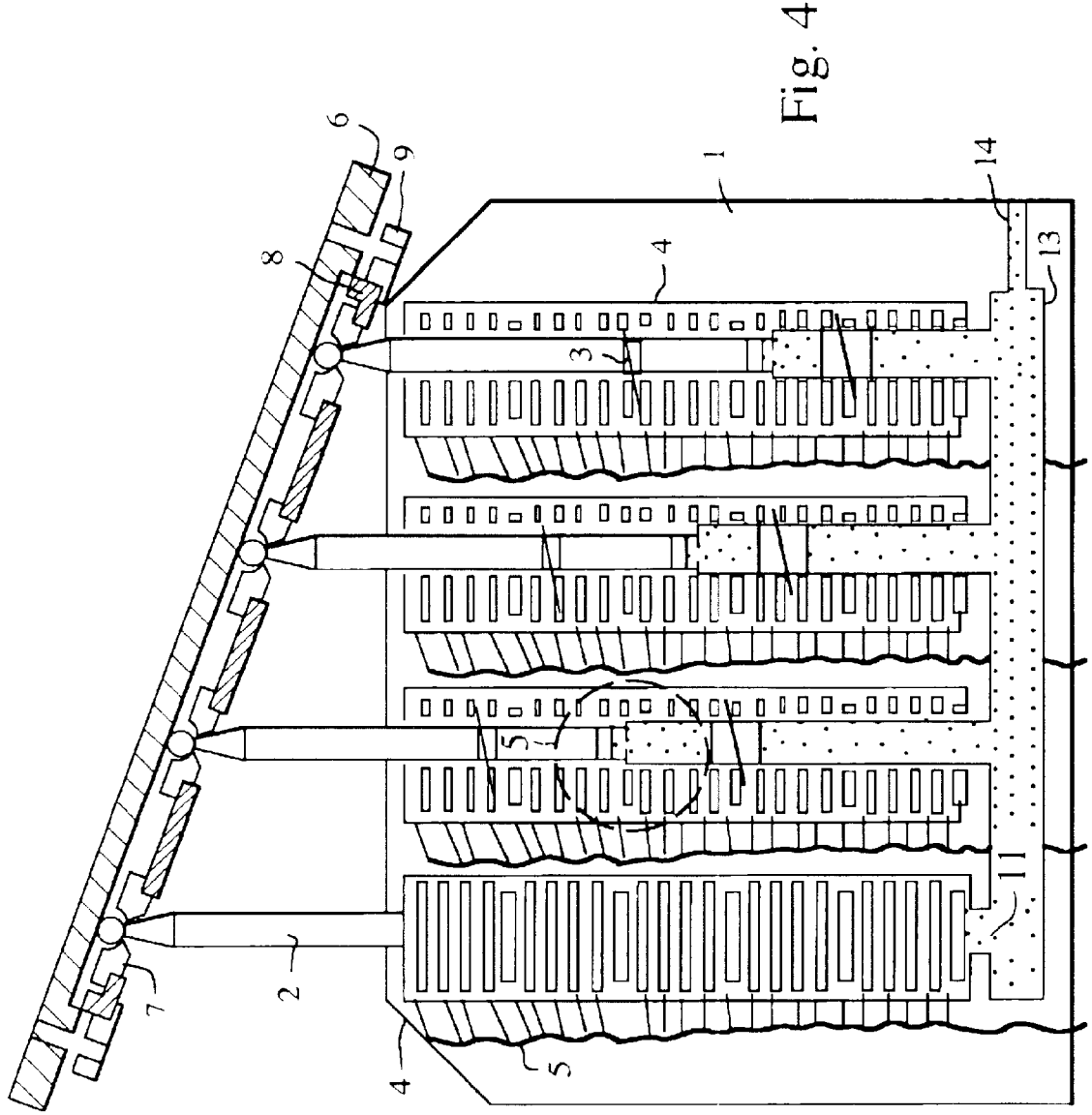
FIG. 4 is a cross-sectional view of the housing assembly, and four exemplary actuator shafts with the antenna in a deflected position as actuated by the disposed energized magnets (or a linear actuator), and a magneto-rheological fluid reservoir.

In operation, in this exemplary embodiment, digital multiplexed signals are provided to specific electromagnetic rings within each stack 4 via the stack wiring 5. For example, the stack 4 comprises electromagnetic rings 4A, 4B, . . . 4N. As the ring magnets are energized, an energized magnet ring establishes a magnetic field that draws the actuator shaft 2, with its embedded magnet 3, to the specific energized ring electromagnet location within the ring electromagnet stack 4. By de-energizing and energizing ring magnets at different locations within each ring electromagnet stack 4, the actuator shafts 2 move up or down within the housing 1, thereby changing the position of the mount structure 6. FIG. 4 illustrates the mount structure at one position within a gimbal range of motion. In one exemplary embodiment, the gimbal range of motion is on the order of 27° from the center axis, or 54° total side to side.

In an exemplary embodiment, the actuators 2 with the actuator magnets 3 and the ring electromagnetic stacks comprise linear motor actuators. Linear motors are commercially available systems. For example, the LINMOT P motor marketed by NTI, Ltd., Technoparkstrasse 1, CH-8005 Zurich Switzerland, may be suitable for the purpose in some exemplary applications.

Figure 5:
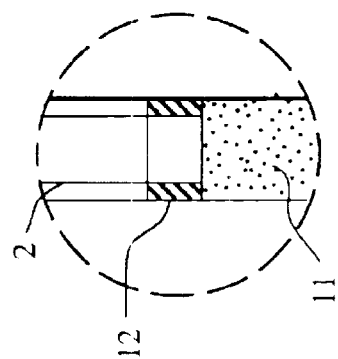
FIG. 5 is an enlarged view of a portion of the area within phantom circle 5 in FIG. 4, illustrating an exemplary seal arrangement around the actuator shaft.

The system further includes a quantity of magneto-rheological ("MR") fluid 11 held in a fluid reservoir 13. MR fluids contain field polarizable particles and a liquid carrier, which can be a silicon-based or oil-based liquid in exemplary applications. Other liquids can also be employed. The MR fluids are responsive to magnetic fields, with the field polarizable particles becoming polarized and organized into chains of particles. Such chains increase the viscosity of the fluid, and can transform the fluid into a near-solid. In the absence of a magnetic field, the particles are in an unorganized state, and the MR fluid has a lower viscosity than when the fluid is exposed to a magnetic field. The purpose of the magneto-rheological fluid 11 is to provide a mechanism to momentarily lock the mount structure 6 in any respective position within the gimbal range of motion. With each position change of the actuator shafts, the magneto-rheological fluid is displaced, but the total volume remains constant; as one shaft is moved downward, displacing fluid within its opening, another is moved upward to accept the fluid. By energizing electromagnets comprising the ring stacks which are below the piston ends of the actuator, the viscosity of the MR fluid within an opening below an extended shaft is increased, and a locking mechanism is established. The magnetic fluid is confined to the reservoir by seals 12 (FIG. 5) installed adjacent the piston ends of the actuator shafts. The seals can be o-ring like elastomeric structures which provide a seal between the cylinder wall and the piston. The MR fluid can be filled into the reservoir 13 through a fill port 14, which is subsequently sealed.

The application of MR fluid, which thickens in the presence of magnetic flux, permits locking and unlocking of the gimbal mount at high speeds, e.g. 1000 cycles per second. For applications such as a gimbal mount used to mount a seeker head in an airborne missile, for example, this can assure that the system has lock-on and pointing stability in all modes of operation including launch mode. Silicon-based or oil-based fluids can withstand high forces, e.g. 50,000 psi in some applications.

In an exemplary embodiment, the electromagnets comprising the rings 4 are DC devices which are turned on and off using digital technology.

Figure 6:
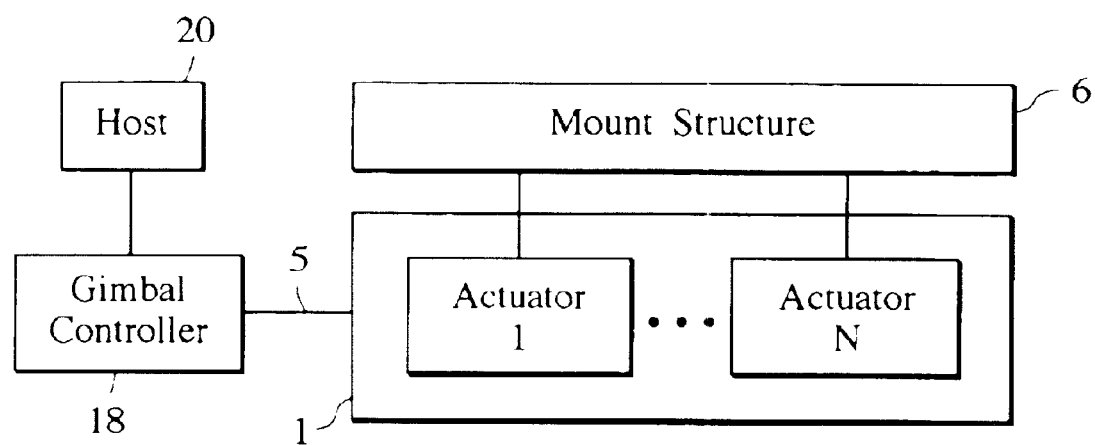
FIG. 6 is a schematic block diagram showing an exemplary control system for the gimbal.

FIG. 6 is a schematic block diagram showing an exemplary control system for the gimbal. A gimbal controller 18 receives pointing commands from the host 20, and converts the commands into drive signals for the respective ring magnet stacks. For example, the controller could include a look-up table which stores parameters for each of a discrete set of mount positions. The parameters determine for that particular position the identification of which of the ring magnets in each stack are to be activated to achieve that position, and to activate the MR fluid to hold that position. The controller then uses these parameters to execute the necessary drive signals to carry out the command.

While the exemplary embodiment shown in FIGS. 1–4 employs seven actuator shafts, the number of actuators employed in the gimbal can vary depending on the requirements of a given application. For example, as few as two actuator shafts could be employed. If only two shafts are employed, the mount structure would typically be constrained so that it pivots about a pivot axis transverse to a center axis, instead of generally moving about a center axis. In another embodiment, three shafts are employed, equally spaced from the center axis and spaced apart by 120°.

Although the foregoing has been a description and illustration of specific embodiments of the invention, various modifications and changes thereto can be made by persons skilled in the art without departing from the scope and spirit of the invention as defined by the following claims.

What is claimed is:

1. A multiple ball joint gimbal mount apparatus comprising:
    a mount platform structure;
    a plurality of linear motor actuators arranged in a housing assembly; each actuator including an actuator shaft, and an actuator connector structure at a distal end of the shaft;
    the platform structure comprising a plurality of ball joint platform connectors each for coupling to a corresponding actuator connector structure to form a pivoting connection between the actuator shaft and the platform structure;
    a controller for selectively actuating said plurality of linear motor actuators to selectively position the plurality of actuator shafts along respective shaft axes and position the mount platform structure at a selected position within a gimbal range of motion; and
    means for selectively locking the mount platform structure in the selected position, said means comprising a supply of magneto-rheological (MR) fluid disposed in a closed reservoir in fluid communication with piston ends of the actuators, and an electromagnetic circuit for applying a magnetic field to said MR fluid to activate said fluid.

2. The apparatus of claim 1, wherein each of said actuator connectors includes a ball structure at said distal end, and said platform connectors each comprise a socket structure for capturing a corresponding ball structure in a ball-socket arrangement.

3. The apparatus of claim 1, wherein said plurality of actuators are arranged on a circular configuration and on equal spacing from adjacent actuators.

4. The apparatus of claim 3, wherein said plurality of actuators includes at least three actuators.

5. A gimbal mount apparatus comprising:
    a mount platform structure;
    a plurality of cylinders arranged in a housing assembly;
    a plurality of actuators disposed in the cylinders;
    each actuator including an actuator shaft, a piston at one end of the actuator shaft, a actuator connector at a distal end of the shaft, and a magnet in the actuator shaft between the piston and the connector;
    the platform structure comprising a plurality of platform connectors each for coupling to a corresponding actuator connector to form a pivoting connection between the actuator shaft and the platform structure;
    a plurality of electromagnets associated with each cylinder,
    a circuit for selectively actuating said plurality of electromagnets for each cylinder to selectively position the plurality of actuators along respective cylinder axes and position the mount platform structure at a selected position within a gimbal range of motion.

6. The apparatus of claim 5, wherein said plurality of actuators are arranged on a circular configuration and on equal spacing from adjacent actuators.

7. The apparatus of claim 5, wherein said plurality of actuators includes at least three actuators.

8. The apparatus of claim 5, wherein each of said actuator connectors includes a ball structure at a distal end of an actuator, and said platform connectors each comprise a socket structure for capturing a corresponding ball structure in a ball-socket arrangement.

9. The apparatus of claim 5, further comprising:
    means for selectively locking the mount platform structure in the selected positions.

10. The apparatus of claim 9, wherein the means for selectively locking comprises a supply of magneto rheological (MR) fluid dispose in a closed reservoir in fluid communication with piston ends of the actuators.

11. A gimbal apparatus comprising:
    a fluid reservoir;

a plurality of cylinders fluidically connected to the fluid reservoir, a plurality of actuators disposed in the cylinders;

each actuator including an actuator shaft, a piston at one end of the actuator shaft, a connector at the other end of the shaft, and a magnet in the actuator shaft between the piston and the connector;

a magneto-rheological fluid disposed in the fluid reservoir;

an electromagnetic circuit for selectively applying a magnetic field to the magneto-rheological fluid to lock the actuators in respective positions within a gimbal range of motion.

12. The apparatus of claim 11, wherein said plurality of actuators are arranged on a circular configuration and on equal spacing from adjacent actuators.

13. The apparatus of claim 12, wherein said plurality of actuators includes at least three actuators.

14. The gimbal apparatus of claim 11, further comprising:

a mount platform structure; and a plurality of ball joint platform connectors each for coupling to a corresponding actuator connector to form a pivoting connection between the actuator shaft and the platform structure.

15. The gimbal apparatus of claim 14, wherein said actuator connectors each comprise a ball structure, and said ball joint platform connectors each comprise a socket structure for capturing a corresponding ball structure in a ball-socket arrangement.

16. The gimbal apparatus of claim 13, further comprising:

a plurality of electromagnets associated with each cylinder; and a circuit for selectively actuating said plurality of electromagnets for each cylinder to selectivity position the plurality of actuators along respective cylinder axes and position the mount platform structure at a selected position within a gimbal range of motion.

17. The gimbal apparatus of claim 16, wherein said electromagnet circuit for selectively applying a magnetic field to the magneto-rheological fluid is comprised of one or more of said plurality of electromagnets for each cylinder.

* * * * *